United States Patent [19]

Hawkins et al.

[11] Patent Number: 4,855,380

[45] Date of Patent: Aug. 8, 1989

[54] CYCLOPENTADIENE-CONTAINING CYCLIC POLYCARBONATE OLIGOMER

[75] Inventors: Christopher M. Hawkins, Evansville; Edgar E. Bostick, Mt. Vernon, both of Ind.

[73] Assignee: General Electric Company, Mt. Vernon, Ind.

[21] Appl. No.: 133,854

[22] Filed: Dec. 16, 1987

[51] Int. Cl.$^4$ .............................................. C08G 63/62
[52] U.S. Cl. .................................. 528/370; 528/196; 528/371
[58] Field of Search ....................... 528/370, 196, 371

[56] References Cited

PUBLICATIONS

Miura et al., Bulletin of the Chemical Society of Japan, vol. 50, No. 10, pp. 2682–2685, (1977).

Primary Examiner—Harold D. Anderson
Attorney, Agent, or Firm—Martin Barancik

[57] ABSTRACT

Novel linear aromatic polycarbonate oligomers that contain one or more dicyclopentadiene dicarboxylate diradicals are described. These oligomers are prepared by the reaction of a cyclic aromatic polycarbonate oligomer with an alkali metal or magensium salt of a cyclopentadiene.

1 Claim, No Drawings

CYCLOPENTADIENE-CONTAINING CYCLIC POLYCARBONATE OLIGOMER

FIELD OF THE INVENTION

This invention is concerned with a novel composition. More particularly it pertains to a reactive linear aromatic oligomer composition that contains a dicyclopentadienyl diradical, and to a method for the preparation of such composition.

BACKGROUND OF THE INVENTION

Modern thermoplastic molding resin compositions, depending on the molecular composition of the polymer and on its molecular weight, offer the molder a range of materials with surprisingly good physical properties for use in difficult environments, such as at elevated temperatures. A number of such materials, however, require unusually high fabrication temperatures for efficient processing, such as melt temperatures above 600° F. for injection molding. Because resin manufacturers are constrained to market only grades of resin that can be processed in available equipment, this constraint leads to practical compromises in ultimate physical properties. This problem can be better illustrated, for example, by reference to a specific type of polycarbonate resins.

2,2-bis-(p-hydroxyphenyl)propane polycarbonate (hereinafter referred to as bisphenol-A polycarbonate) is a well known thermoplastic polymer offering good thermal stability, excellent dimensional stability and resistance to creep under load. Injection molding grades of bisphenol-A polycarbonate have intrinsic viscosities (as measured in methylene chloride at 30° C.) in the range of about 0.50 to 0.55 dl/g. A typical polymer in that viscosity range has a weight-average molecular weight of about 30,000, and a number-average molecular weight of about 11,000. The mechanical properties of bisphenol-A polycarbonate increase very rapidly with increased intrinsic viscosity until the intrinsic viscosity reaches about 0.40, and then taper off at least to intrinsic viscosities of about 0.65 dl/g. The melt viscosity of the resin, however, increased rapidly at intrinsic viscosities greater than about 0.45, and at intrinsic viscosities of about 0.6 the melt viscosity is already sufficiently high that injection molding with complex molds becomes quite difficult. Practical commercial molding grades therefore must be constrained to molecular weight that provide a resin with sufficient fluidity at molding temperature but with less than maximum physical properties.

It has now been found that insertion of small quantities of dicyclopentadiene or dicyclopentadiene-type dicarboxylic acid groups into the structure of these resins brings about processing advantages without significant loss of properties.

The synthesis of 1:1 polyesters of dicyclopentadiene dicarboxylic acid with bis-(p-hydroxyphenyl)ether and with 2,2-bis-(p-hydroxyphenyl)propane is described by Mirva et al. in Bulletin of the Chemical Society of Japan, Vol. 50, No. 10, pp 2682–2685 (1977).

It is an object of this invention to provide a novel composition that provides a convenient intermediate for the preparation of modified polycarbonate resins.

Another object is to provide intermediates which are easily prepared and have properties which enable them to be used in integrated resin preparation-processing methods.

A further object is to provide a method for preparation of such intermediates.

Other objects will become evident to one skilled in the art on reading this entire specification including amended claims.

BRIEF SUMMARY OF THE INVENTION

A method for preparing linear oligomers that contain one or more dicyclopentadienyl dicarboxylate diradicals and variously from 2 to about 30 structural units having the formula:

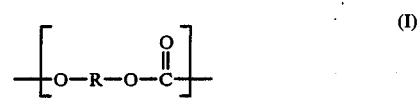

wherein at least about 60% of the total number of R values in said composition being aromatic and the balance of the R values being aliphatic, alicyclic or aromatic, said method comprising reacting a precursor aromatic cyclic polycarbonate oligomer having the formula:

wherein n is variously 2 to about 30. The preparation of such oilgomers is described in U.S. Pat. No. 4,644,053 to Brunelle et al., incorporated herein by reference.

Preferably at least about 60% and more preferably at least about 80% of the total number of R values in the cyclic oligomer mixtures, and most desirably all of said R values, are aromatic. The aromatic R radicals preferably have the formula:

wherein each of $A^1$ and $A^2$ is a single-ring divalent aromatic radical and $Y^2$ is a bridging radical in which one or two atoms separate $A^1$ from $A^2$. The free valence bonds in Formula I are usually in the meta or para positions of $A^1$ and $A^2$ in relation to $Y^2$. Such R values may be considered as being derived from bisphenols of the formula HO—$A^1$—$Y^2$—$A^2$—OH. A preferred bisphenol is bisphenol-A. Frequent reference to bisphenols will be made hereinafter, but it should be understood that R values derived from suitable compounds other than bisphenols may be employed as appropriate.

The novel composition of this invention provides a useful and convenient material for introducing the dicyclopentadienyl diradical into the structure of aromatic polycarbonate or copoly(ester carbonate) resins. Such modified aromatic polycarbonate resins and their preparation are described in copending U.S. patent application Ser. No. 133,857 filed on even date herewith, incorporated herein by reference.

DETAILED DESCRIPTION INCLUDING PREFERRED EMBODIMENTS

It has now been found that an aromatic polycarbonate oligomer containing the dicyclopentadienyl diradical incorporated within its structure is formed by reacting cyclic aromatic polycarbonate oligomer having the structure of Formula II with an alkali metal or magnesium salt of cyclopentadiene. It is believed that the reaction proceeds by cleavage of the carbonate group at either of its single carbon-oxygen bonds, with the cyclopentadienyl anion bonding to the carbonyl-capped fragment and the metal cation or hydrogen to the oxygen anion to form a hydroxyl-capped fragment, as shown in Equation (A):

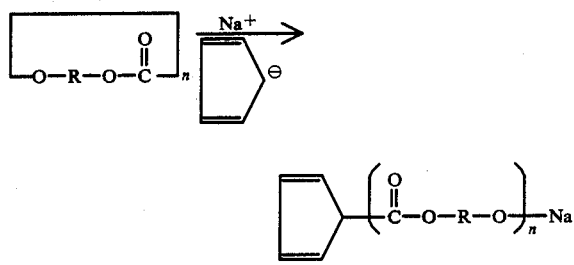

Thus, it is contemplated that each mole of cyclopentadiene salt that reacts ruptures one mole of carbonate bond to form a polycarbonate fragment end-capped with a cyclopentadienyl radical and with a phenolic hydroxy group. Further reaction of this fragment with the cyclopentadiene salt may yield fragments which are capped on both termini with either phenolic hydroxy groups or cyclopentadiene groups.

The cyclopentadienyl-capped fragments undergo spontaneous 4+2 cycloaddition to form an oligomer that contains one or more dicyclopentadienyl groups and the oligomer is end-capped with phenolic hydroxy groups.

It is contemplated from the foregoing that reaction of one mole of the oligomer of Formula II containing n carbonate linkages with n−x moles (wherein x=1 to n) of cyclopentadiene salt will produce a mixture of hydroxy-capped oligomers containing an average of x/2 dicyclopentadienyl diradicals and n−x carbonate groups.

The linear oligomer of this invention has incorporated in its structure at least one dicyclopentadienyl diradical of the Formula III,

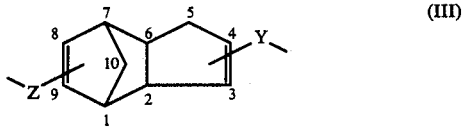

(III)

wherein Z and Y are carboxyl radicals with the carbon atom of Z attached to carbon atoms 1 or any of carbon atoms 7 to 10, and the carbon atom of Y is attached to any carbon atom 2 to 6. The dangling bonds of Z and Y are attached to R values of Formula I above.

Useful oligomer structures have incorporated therein dicyclopentadienyl diradicals of Formula III wherein any hydrogen atom attached to carbon is replaced by a phenyl group, an alkyl group having 1 to 6 carbon atoms, an alkyl substituted phenyl group having 1 to 14 carbon atoms, a fluorine, chlorine or bromine atom, an alkoxy group of 1 to 6 carbon atoms, or a cyano group.

Contemplated as operable in the synthesis of the present invention are the monomeric alkali metal or magnesium salts of the dicyclopentadienyl structures described above. It is recognized by one skilled in the art that the foregoing Formula III may exist as endo- or exo-isomers, and the foregoing description of the dimer applies to either isomer or a mixture of these.

The preparation of the alkali metal or magnesium salts of cyclopentadiene in tetrahydrofuran is well known and is described, for example, by D. Peters, *J. Chem. Soc.*, p 1757 (1959); and preparation of the magnesium salt by reaction of ethyl magnesium bromide, ibid., at p 1761. The use of sodium and 1,2-dimethoxyethane is described in *Organic Synthesis*, Collective Vol. 5, (edited by H. E. Baumgarten), p 1001 (1973). For the lithium salt of cyclopentadiene, see M. A. El-Hinnawi et al., *J. Organomet. Chem.* 281, p 119 (1985); and C. Peppe et al., *J. Chem. Soc. Dalton Trans.* 12, p 2592 (1981). For preparation of the potassium salt, see I. A. Garbuzova et al., *J. Organometal. Chem.*, 279, p 327 (1985); and H. Alper and D. E. Laycock, Synthesis 10, p 799 (1980).

Cyclopentadiene is not ordinarily purchased as such since it is unstable in storage, and at room temperature spontaneously forms dicyclopentadiene as well as tri-, tetra, and high polymers. Dicyclopentadiene is readily available as a by-product of thermal cracking of propane and naphtha, for example, to produce olefins. Heat-soaking the heavy ends by-product and distillation under prescribed conditions results in recovery of cyclopentadiene. Refined or higher purity (95 wt%) dicyclopentadiene is available, and is preferred as the source of freshly distilled monomer for preparing the alkali metal or magnesium salts for use in this invention.

The term "alkali metal salt" as used herein means the lithium, sodium or potassium salt of cyclopentadiene. For use in the present invention, the sodium salt is preferred. When the magnesium salt is used, it is believed that the cyclic oligomer is formed preferentially with magnesium bonded to both anionic sites.

The oligomer of Formula II is preferably reacted in solution of tetrahydrofuran, for example, with the alkali metal salt of cyclopentadiene. The reaction is conducted with 1 (one) to about n moles of cyclopentadiene salt per mole of oligomer. The reactants are soluble in the solvent employed.

EXAMPLES

The examples which follow are given for illustrative purposes and are not intended to limit the scope of this invention, which scope is determined by this entire specification including the appended claims.

All references in the specification and examples to "Intrinsic Viscosity" (IV) refer to the value measured at 30° C. in dichloromethane, unless explicitly stated to be otherwise.

All reference in the specification and examples to "melt viscosity" refer to the melt viscosity as measured by the Kasha Index (KI). The KI of a resin is a measurement of its melt viscosity and is obtained in the following manner: 7 grams of resin, dried a minimum of 90 minutes at 125° C., are added to a modified Tinius-Olsen Model T3 melt indexer; the temperature in the indexer is maintained at 300° C. and the resin is heated at this temperature for 6 or 12 minutes. After 6 or 12 minutes, the resin is forced through a 0.1048 cm and an applied force of 78.7N. The time required for the plunger to travel two inches is measured in centiseconds; that required time is reported as the KI.

EXAMPLE 1

This example illustrates the preparation of a linear oligomer of bisphenol-A esterified with dicyclopentadiene dicarboxylic acid, and the use of the linear oligomer to incorporate the dicyclopentadienyl moiety in a polycarbonate resin. The oligomer is prepared by reaction of a cyclic polycarbonate oligomer with cyclopentadienyl sodium salt. The cyclic oligomer may be prepared as described in U.S. Pat. No. 4,644,053 to Brunelle et al., incorporated herein by reference.

A 1 L four neck flask was fitted with a mechanical stirrer, thermometer, addition funnel, and a condenser connected to a positive pressure of argon and charged with tetrahydrofuran (500 ml) and sodium hydride (5.94 g, 0.248 mole) from a 60% oil dispersion. Cyclopentadiene (13.0 g, 0.197 mole) was rapidly added to the Na/THF mixture. The temperature rose to 35° C. with foaming and concomitant red color formation. The foaming stopped and temperature cooled to 25° C. in approximately 15 minutes. A solution of cyclic polycarbonate (50.0 g, 0.197 mole) in tetrahydrofuran (500 ml) was rapidly added. After 4 hours, 250 ml of the reaction mixture was added to 100 ml 5% HCl, shaken and washed with 10% sodium bicarbonate. After drying with magnesium sulfate, and removal of solvent in vacuo, 15.0 grams of yellow cyclopentadiene/polycarbonate oligomer product remained.

EXAMPLE 2

This example is not part of this invention. It is given to illustrate a utility for the product of this invention.

A 1 L four neck flask was fitted with a mechanical stirrer, a pH probe, a gas inlet tube and a Claisen adapter to which was attached to a dry ice condenser and an aqueous caustic inlet tube. To the flask was added methylene chloride (340 ml), H2O (280 ml), bisphenol-A (35.0 g, 0.154 mole) triethyl amine (1.1 ml), phenol (0.47 g, 0.005 mole), and 10.0 g of the cyclopentadiene/polycarbonate oligomer synthesized above. Phosgene (10.0 g, 0.1 mole) was then added at 1 g/min for 10 minutes with pH controlled at 8-10. After a 10 minute nitrogen purge to remove excess phosgene, the organic phase was washed once with 1% HCl followed by three washes with 300 ml water. After drying with MgSO4 the solution was precipitated into 1500 ml MeOH and dried in a 125° C. oven overnight. The intrinsic viscosity in dichloromethane was 0.494. The melt viscosity (KI) was 1660. The intrinsic viscosity of the recovered material from the KI evaluation was 0.482. The weight percent of dicyclopentadiene dicarboxylate was found to be 1.4 by infrared spectroscopy.

EXAMPLE 3

A 2 L four neck flask was fitted with a mechanical stirrer, thermometer, addition funnel, and a condenser connected to a positive pressure of argon and charged with tetrahydrofuran (500 mL) and sodium hydride (6.0 g, 0.25 mole from a 60% oil dispersion). Cyclopentadiene (16.5 g, 0.25 mole) was rapidly added to the Na/THF mixture. After 10 minutes a solution of cyclic polycarbonate (50.0 g, 0.197 mole) in tetrahydrofuran (500 mL) was rapidly added to the 65° C. solution. After 3 hours, 500 mL of 5% HCl was added to the solution. The organic phase was removed in vaccuo to leave a solid which was dissolved in methylene chloride and filtered through silica gel. After solvent removal and vacuum drying, a yellow powder remained.

EXAMPLE 4

This example is not part of this invention. It is given to illustrate a utility for the product of this invention.

A 2 L four neck Morton flask was fitted with a mechanical stirrer, a pH probe, a gas inlet tube and a Claisen adapter to which was attached a dry ice condenser and an aqueous caustic inlet tube. To the flask was added methylene chloride (600 mL), H2O (300 mL), bisphenol-A (47.0 g, 0.206 mole), triethyl amine (1.0 g, 0.01 mole), phenol (0.60 g, 0.0064 mole), and 10.0 g of the cyclopentadiene/polycarbonate oligomer synthesized above. Phosgene (30.0 g, 0.30 mole) was then added a 1 g/min. for 30 minutes with pH controlled at 9.5–10.5. After a 10 minute nitrogen purge to remove excess phosgene, the organic phase was washed once with 1% HCl followed by three washes with water. After dilution with methylene chloride to 500 mL, the solution was precipitated into 1 L of methanol and dried overnight. The intrinsic viscosity of the resulting resin in dichloromethane was 0.466. The Tg was 149 and the weight average molecular weight was 25,900. Infrared analysis reveals that the resin contains 4% (wt) of dicyclopentadiene dicarboxylate.

What is claimed is:

1. A composition comprising an oligomeric mixture produced by reacting a precursor cyclic oligomer composition having the formula:

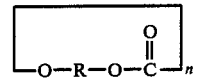

wherein n is variously 2 to about 30, wherein R in at least about 60% of the total number of R values of said composition being aromatic and the balance of the R values being aliphatic, alicyclic or aromatic with an alkali metal or magnesium salt of cyclopentadiene or substituted cyclopentadiene and recovering said cyclopentadiene-containing oligomers.

* * * * *